(12) United States Patent
Bar-Cohen et al.

(10) Patent No.: US 7,156,189 B1
(45) Date of Patent: Jan. 2, 2007

(54) SELF MOUNTABLE AND EXTRACTABLE ULTRASONIC/SONIC ANCHOR

(75) Inventors: Yoseph Bar-Cohen, Seal Beach, CA (US); Stewart Sherrit, Glendale, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 47 days.

(21) Appl. No.: 11/001,465

(22) Filed: Dec. 1, 2004

(51) Int. Cl.
- *E21C 37/02* (2006.01)
- *H02N 2/00* (2006.01)
- *B25D 17/06* (2006.01)
- *A61B 17/00* (2006.01)

(52) U.S. Cl. .................. 173/91; 173/102; 173/103; 173/112; 173/122; 173/166; 173/131; 310/323.18; 310/323.19

(58) Field of Classification Search .......... 173/91, 173/112, 113, 122, 221, 166, 171, 131, 102, 173/103; 310/323.18, 323.19; 175/55, 56
See application file for complete search history.

(56) References Cited

U.S. PATENT DOCUMENTS

| | | | |
|---|---|---|---|
| 1,528,812 A * | 3/1925 | Binnie .................... 173/103 |
| 2,851,251 A * | 9/1958 | Mori ....................... 173/73 |
| 2,946,314 A * | 7/1960 | Nast ....................... 173/102 |
| 3,352,369 A | 11/1967 | Bodine, Jr. |
| 3,431,988 A | 3/1969 | Bodine, Jr. |
| 3,595,133 A * | 7/1971 | Foster ..................... 91/10 |
| 3,619,671 A * | 11/1971 | Shoh ....................... 310/325 |
| 3,624,760 A | 11/1971 | Bodine |
| 3,683,470 A * | 8/1972 | McMaster et al. ........ 29/33 K |
| 3,800,889 A * | 4/1974 | Bauer ..................... 175/19 |
| 4,033,419 A | 7/1977 | Pennington |
| 4,036,309 A * | 7/1977 | Petreev et al. ........... 173/103 |
| 4,223,744 A * | 9/1980 | Lovingood ............... 173/48 |
| 4,319,716 A * | 3/1982 | Lauer ..................... 239/102.2 |
| 4,333,259 A | 6/1982 | Pin-Huang |
| 4,571,183 A * | 2/1986 | Nash ...................... 433/116 |
| 4,674,949 A | 6/1987 | Kroczynski |
| 4,738,583 A | 4/1988 | Macconochie et al. |
| 4,817,712 A * | 4/1989 | Bodine .................... 166/249 |
| 4,828,052 A * | 5/1989 | Duran et al. ............. 175/55 |
| 4,838,853 A * | 6/1989 | Parisi ..................... 604/22 |
| 5,094,311 A | 3/1992 | Akeel |
| 5,115,717 A * | 5/1992 | Roemer ................... 91/49 |
| 5,121,805 A | 6/1992 | Collie |
| 5,301,758 A * | 4/1994 | Jenne ..................... 175/21 |
| 5,377,551 A * | 1/1995 | Vacquer .................. 73/864.45 |
| 5,417,290 A * | 5/1995 | Barrow ................... 175/56 |
| 5,468,099 A | 11/1995 | Wheetley et al. |
| 5,597,345 A * | 1/1997 | Young ..................... 451/165 |
| 5,816,342 A * | 10/1998 | Prater et al. ............. 173/91 |
| 5,993,458 A | 11/1999 | Vaitekunas et al. |
| 5,993,477 A | 11/1999 | Vaitekunas et al. |
| 6,068,226 A | 5/2000 | Anders |
| 6,105,695 A | 8/2000 | Bar-Cohen et al. |
| 6,204,592 B1 * | 3/2001 | Hur ........................ 310/323.18 |
| 6,498,421 B1 | 12/2002 | Oh et al. |
| 6,617,760 B1 * | 9/2003 | Peterson et al. ......... 310/328 |
| 6,689,087 B1 * | 2/2004 | Pal et al. ................. 604/22 |

(Continued)

*Primary Examiner*—Brian Nash

(57) ABSTRACT

Self drilling anchors and related methods and apparatus. In one embodiment an apparatus comprises a drill bit, a hammer mechanism for hammering the drill bit in a first direction and in a second direction, and a selection mechanism for controlling whether, at a given point in time, the drill bit is hammered in the first or second direction.

14 Claims, 4 Drawing Sheets

U.S. PATENT DOCUMENTS

| | | | |
|---|---|---|---|
| 6,731,047 B1 * | 5/2004 | Kauf et al. | 310/317 |
| 6,814,161 B1 * | 11/2004 | Draney et al. | 175/19 |
| 6,863,136 B1 * | 3/2005 | Bar-Cohen et al. | 175/55 |
| 2003/0116355 A1 | 6/2003 | Bar-Cohen et al. | |
| 2004/0007387 A1 | 1/2004 | Bar-Cohen et al. | |
| 2004/0047485 A1 | 3/2004 | Sherrit et al. | |
| 2004/0082884 A1 | 4/2004 | Pal et al. | |
| 2005/0067224 A1 * | 3/2005 | Brewster | 182/108 |
| 2005/0121231 A1 * | 6/2005 | Clayton | 175/55 |
| 2005/0150356 A1 * | 7/2005 | Takegawa | 84/422.3 |

* cited by examiner

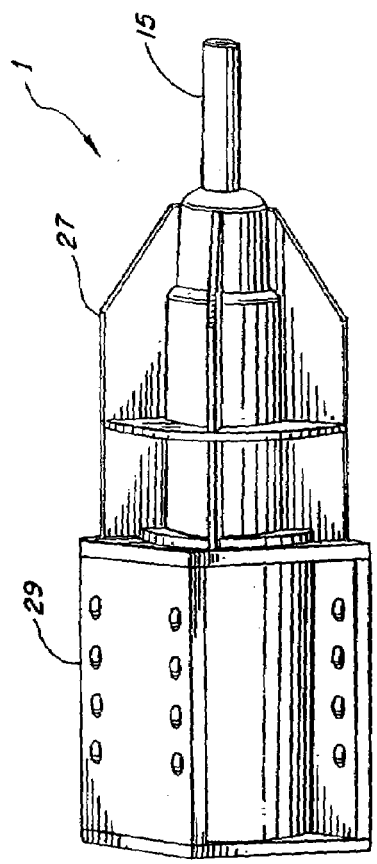
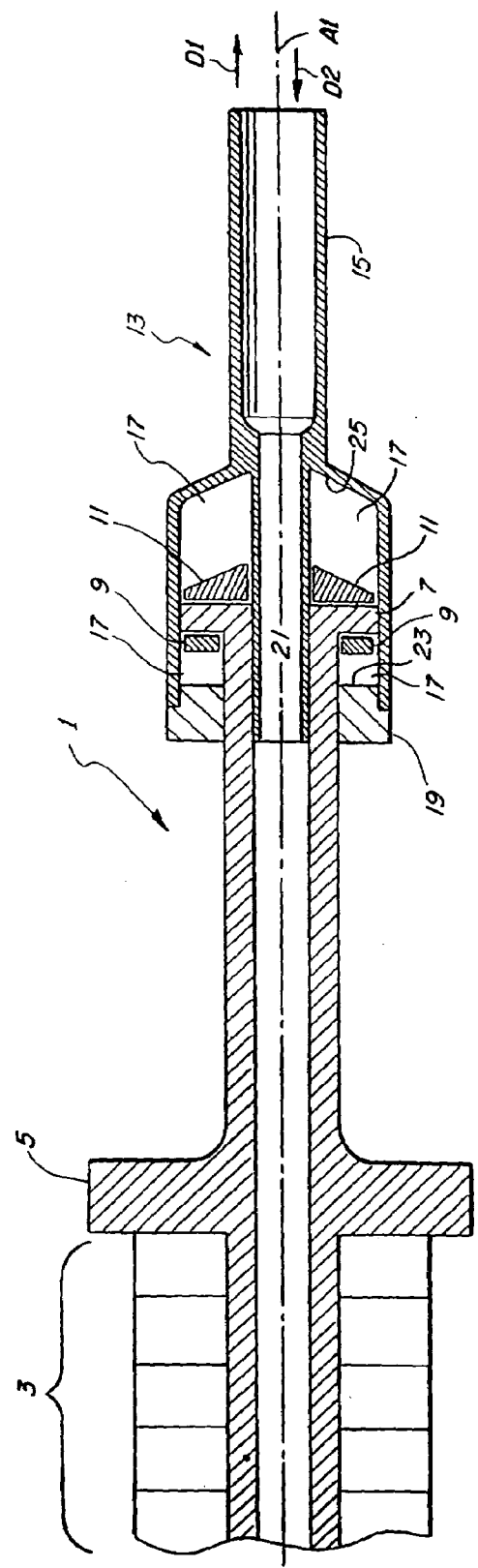
FIG. 1
FIG. 2

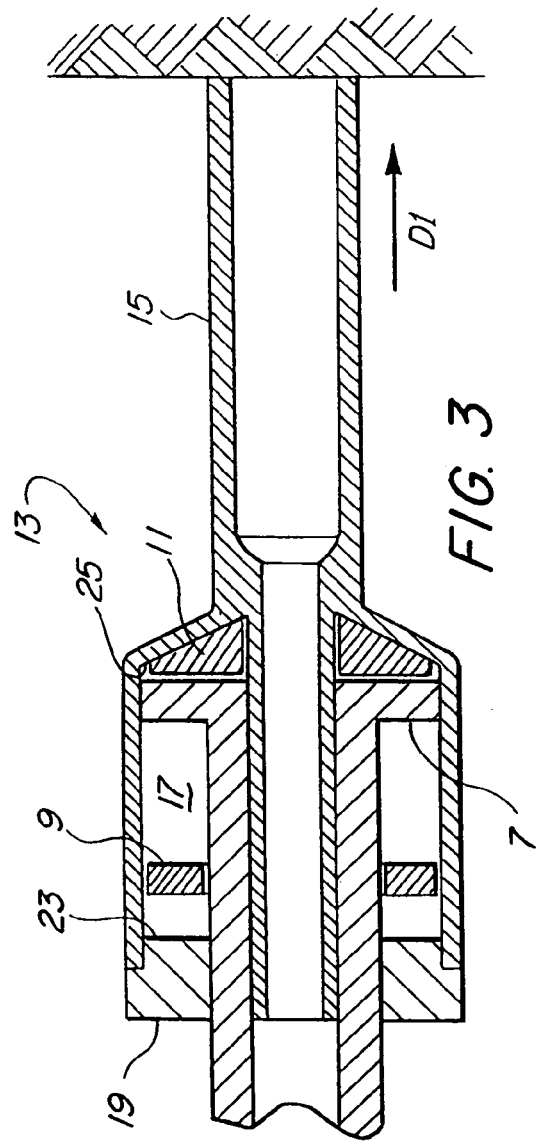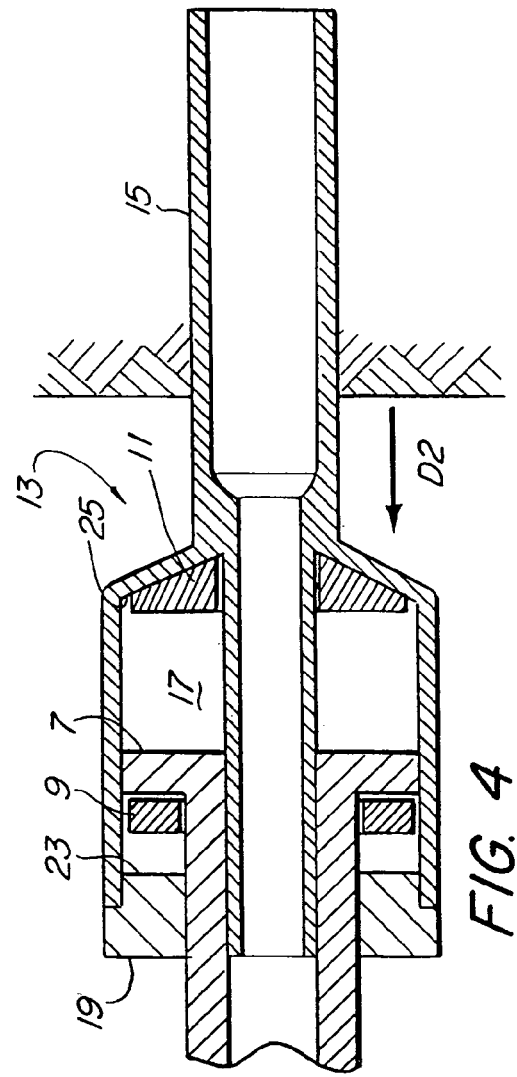

SELF MOUNTABLE AND EXTRACTABLE ULTRASONIC/SONIC ANCHOR

STATEMENT REGARDING FEDERALLY SPONSORED RESEARCH

The invention described hereunder was made in the performance of work under a NASA contract, and is subject to the provisions of Public Law #96-517 (35 U.S.C. 202) in which the Contractor has elected not to retain title.

FIELD OF THE INVENTION

The present invention relates generally to mobile devices, climbing apparatus and systems, drilling apparatus and methods, and anchoring apparatus and methods.

SUMMARY OF THE INVENTION

The present invention includes a self drilling anchor and related methods and apparatus. One instance of an embodiment of the present invention includes a drill bit, a hammer mechanism for hammering the drill bit in a first direction and in a second direction, and a selection mechanism for controlling whether, at a given point in time, the drill bit is hammered in the first or second direction.

Another instance of an embodiment of the present invention includes a climbing tool having a drill bit and/or drill bit assembly wherein the drill bit and/or drill bit assembly is adapted to support a climber hanging from the tool while the tool remains in a hole formed by the tool.

Another instance of an embodiment of the present invention includes a foot assembly coupled to an apparatus and positioned to at least partially support the apparatus, the foot assembly having a drill bit wherein the drill bit can be extended such that it projects outward from the foot and retracted so that it does not project outward from the foot.

Another instance of an embodiment of the present invention includes an Ultrasonic/Sonic (U/S) drill having at least a first free mass and a second free mass wherein the drill is configured to use the first free mass to drive a bit in a first direction and the second free mass to drive the bit in a second direction.

Still another instance of an embodiment of the present invention includes a method of propulsion having: using a drill bit to form a hole, and while the drill bit is in the hole, exerting a force having a component in line with a desired direction of movement on the drill bit and/or a drill bit assembly coupled to the drill bit.

Another instance of an embodiment of the present invention includes a method of moving a body in a desired direction across a surface having: coupling a plurality of drill assemblies to the body; drilling a first hole in the surface with a first drill assembly of the plurality of drill assemblies; while the drill bit of the first drill assembly remains in the first hole, moving at least a portion of the body relative to the first hole and at least partially in the desired direction; while the drill bit of the first drill assembly remains in the first hole, drilling a second hole in the surface with a second drill assembly; while the drill bit of the second drill assembly remains in the second hole, removing the drill bit of the first drill assembly from the first hole; and while the drill bit of the second assembly remains in the second hole, moving at least a portion of the body relative to the second hole and at least partially in the desired direction.

Still another instance of an embodiment of the present invention includes a method of anchoring an apparatus to a surface having: providing the apparatus with at least one drill assembly having a drill bit; using the drill bit to drill into the surface; and using the drill assembly as an anchor.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIG. 1 is a perspective view of an ultrasonic/sonic drill in accordance with an embodiment of the invention.

FIG. 2 is partial a cutaway side view of the drill of FIG. 1.

FIG. 3 is a partial cutaway side view of the drill of FIG. 1 configured to drill into a surface.

FIG. 4 is a partial cutaway side view of the drill of FIG. 1 configured to hammer itself out of a surface.

DETAILED DESCRIPTION OF THE PREFERRED EMBODIMENTS

Figure 5:
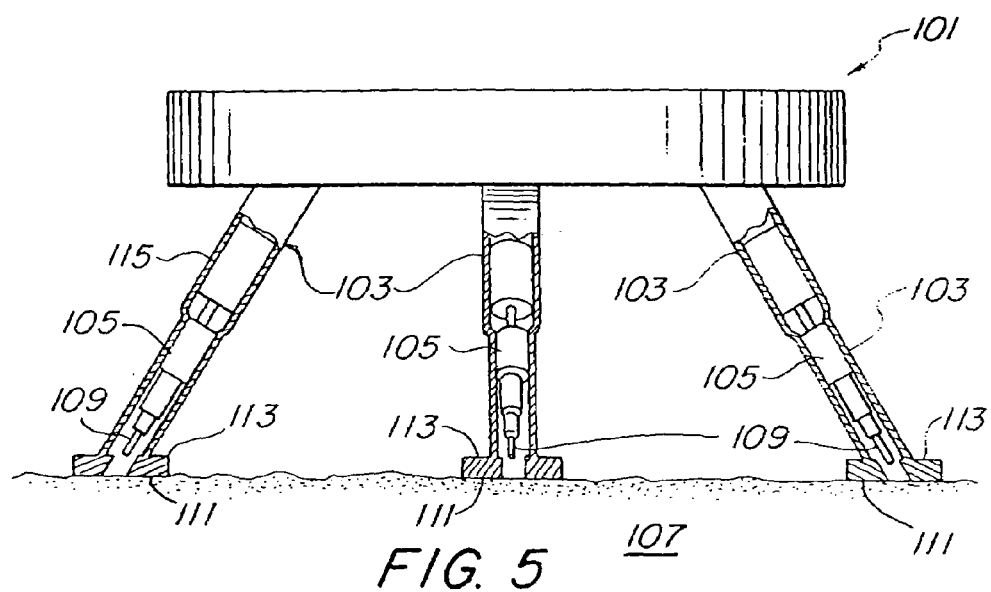
FIG. 5 is a cutaway side view of a platform in accordance with an embodiment of the invention.

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention. Moreover, the embodiments of the present invention described herein comprise multiple novel features with each described embodiment including either a single such feature or a combination of such features. Other contemplated embodiments include all combinations of one or more such novel features not explicitly described herein as such combinations are readily discernable from the embodiments described.

A novel Ultrasonic/Sonic drill/anchor (USDA) that is both mountable and extractable using minimal axial load is discussed herein. This active drill/anchor operates as a penetrator drilling rocks, concrete, stones and other brittle materials and structures and can be extracted by a reverse activation mechanism. The device is applicable at least for space exploration, military, search and rescue, homeland defense and recreation applications including climbing walls, concrete structures, mountains and other obstacles as well as traversing over ceilings.

At least some unique features of described embodiments of the USDA is that it: (a) penetrates brittle objects including rocks, stones, and concrete; (b) can be mounted and extracted using minimal axial forces; (c) requires low average power to operate; (d) can be embodied in a lightweight mechanism that has simple configuration and low number of components; (e) is controllable and allows supporting moments and transverse loads; (f) allows for the controlled attachment of object to steep surfaces and overhangs including ceilings; (g) does not require high axial loads and therefore it can support the operation of figure platforms such as legged and wheeled rovers in low gravity planets, anchoring inflatable structures, and astronauts climbing steep mountains; and (h) can be developed for military applications, for use by commandos and in homeland defense operations where there is a need to climb walls, or steep surfaces using portable tools.

In addition to describing a novel USDA, applications for which such a drill/anchor is particularly adapted are also described. However, it should be kept in mind that some such applications may be accomplished using other types of drills/anchors as well.

Self Extracting Drill/Anchor

An embodiment of the invention is a self-extracting drill/anchor that can both hammer a drill bit into a medium, and can extract the drill bit by hammering it out of the medium. In some instances, such an embodiment can be characterized as an apparatus comprising a drill bit, a hammer mechanism for hammering the drill bit in a first direction and in a second direction, and a selection mechanism for controlling whether, at a given point in time, the drill bit is hammered in the first or second direction.

Referring to FIGS. 1–4 an ultrasonic/sonic (U/S) drill 1 includes an actuator 3 for generating vibrations, a horn 5 for amplifying the generated vibrations, a first free mass 9, a second free mass 11, and a drill bit assembly 13. The actuator 3 and horn 5, and a portion of drill bit assembly 13 are housed within mounting assembly 29, and cover 27 (not shown in FIGS. 2–4). The horn 5 includes a tip 7 on an end opposite the actuator 3. The drill bit assembly 13 includes a drill bit 15, a cavity 17, and a collar 19. The drill bit assembly 13 also includes a central bore 21 extending along its length and separated from the cavity 17. The cavity 17 is at least partially defined by a surface 25 and by a surface 23 of the collar 19. The surfaces 23 and 25 form opposite ends of the cavity 17. The drill bit 15 is elongated and has a center axis A1. The first free mass 9, second free mass 11, and horn tip 7 are positioned within the cavity 17, are all moveable relative to each other and to the drill bit assembly 13 along axis A1 and within the cavity 17, and jointly function as a hammer mechanism for hammering the drill bit assembly 13 and the drill bit 15 in a first direction D1 along axis A1, and in a second, opposite direction D2 long axis A1. The horn tip 7 functions as a vibrating element for transmitting amplified vibrations from the actuator 3 to the free masses 9 and 11. When vibrating, the horn tip 7, at least when positioned closer to the surface 23 than to the surface 25, causes the mass 9 to oscillate between the vibrating element/horn tip 7 and the surface 23. Also, at least when positioned closer to surface 25 than the surface 23, the horn tip 7 causes the mass 11 to oscillate between the vibrating element/horn tip 7 and the surface 25. When oscillating between the tip 7 and the surface 23, impacts of the mass 9 against the surface 23 hammer the bit assembly 13 and the drill bit 15 in the direction D2. When oscillating between the tip 7 and the surface 25, impacts of the mass 11 against the surface 25 hammer the bit assembly 13 and the drill bit 15 in the direction D1. As the position of the horn tip 7 determines whether the drill bit is hammered in the direction D1 or the direction D2, it functions as a selection mechanism.

The actuator 3 includes a piezoelectric stack. The actuator 3 is driven at the resonance frequency of the piezoelectric stack and a stress bolt (not shown) holds it in compression to prevent fracture during operation. Actuator 3 may be constructed in any manner so long as it can function as a source of vibrations to be translated into movement of masses 9 and 11. Although the resonance frequency of the piezoelectric stack will likely vary between embodiments, it is contemplated that in some instances it will be advantageous to have an actuator that has a resonance frequency of about 20 kHz, and/or between about X1 and X2 kHz where the value pair (X1, X2) is one of the following: (18, 22), (15, 25), (10, 30), and (5, 35).

The horn 5 amplifies the displacements of the stack of actuator 3 and causes movement of the mass 11 and the mass 9. To produce a short device, drill 1 can be designed with a folded horn configuration as discussed in U.S. Pat. App. No. 2004-0047485. As with the actuator 3, the horn 5 may be constructed in any manner so long as it can function to amplify and transfer vibrations of the actuator 3 to the masses 9 and 11.

The first free mass 9 and the second free mass 11 may also be constructed in any manner so long as they function to translate movement of horn 5 into impacts on drill bit assembly 13 and drill bit 15. However, it is contemplated that the masses 9 and 11 may advantageously comprise a hard material such as hardened steel or tungsten carbide. The impacts of the free masses create stress pulses that propagate to the interface of the drill bit 15 and any rock or other medium with which drill 1 is placed in contact. If placed in contact with rock, the rock fractures at the impact location when its ultimate strain is exceeded at the rock/bit interface.

Drill bit assembly 13 includes the drill bit 15, the cavity 17, the collar 19, the central bore 21, the surface 23 and the surface 25, and has axis A1 as its center axis. The entire drill bit assembly is coupled to the drill bit 15 in such a manner that movement of the assembly corresponds with movement of the drill bit 15, and movement of drill bit 15 corresponds with movement of the drill bit assembly 13. As such, impacts on the surfaces 23 and 25 by the masses 9 and 11 are transmitted to the bit 15. The drill bit assembly 13 may be constructed in any manner so long as it functions to couple the drill bit 15 to the rest of the drill 1 in such a manner that the free masses can be used to hammer the drill bit 15.

It is contemplated that the length of the cavity 17 should be sufficiently long such that the horn tip 7 can be moved sufficiently far from the surface 23 such that the mass 9 is ineffective at hammering the drill bit assembly 13, and can be moved sufficiently far from the surface 25 such that the mass 11 is ineffective at hammering the drill bit assembly 13. However, the overall length is preferably kept to a minimum such that there are minimal or no positions along the length where both the mass 9 and the mass 11 are ineffective at hammering the drill bit assembly 13. A system based on a standard horn may typically be about 15 cm long, while use of a folded horn may produce a system that is of the order of 10 cm long.

The drill bit 15 may also be constructed in any manner suitable for its intended use. The actual construction of the drill bit 15 will likely vary between embodiments with such variances being based at least in part on the expected medium to be drilled and the environment in which drilling is to occur. However, in some instances it may be advantageous if the drill bit 15 was made of hardened steel to assure long durability and effective operation in various media including rocks, concrete and other objects onto which there may be a need for anchoring. It may also be advantageous if the drill bit 15 is sufficiently thin to allow it to efficiently penetrate the surface onto which there is a need to anchor. It may also be advantageous if it is sufficiently thick to allow it to sustain the levels of expected bending moments as determined by an applied force and moment arm. In some instances, the drill bit 15 may be solid while in others it may be hollow as shown in FIGS. 2–4. It is contemplated that utilizing a hollow bit may facilitate use of the bit to obtain samples of whatever material the bit penetrates, possibly while the bit is also being used to anchor and/or propel a person or apparatus. Although depicted having cylindrical shape, the drill bit 15 may have any external shape and/or any internal shape. As such, some drill bits may have a cross section that is triangular, rectangular, hexagonal, elliptical, or comprises some other symmetrical or non-symmetrical shape.

In some instances, drill 1 may be characterized as an U/S drill comprising at least a first free mass and a second free mass wherein the drill is configured to use the first free mass to drive a bit in a first direction and the second free mass to drive the bit in a second direction. This characterization focuses on one difference between the present invention and other U/S drills such as those discussed in U.S. App. No. 2003-0116355 (Pub. Jun. 26, 2003, "Ultrasonic/Sonic Mechanism of Deep Drilling (USMOD)"), 2004-0047485 (Pub. Mar. 11, 2004, "Folded Horns for Vibration Actuators"), and 2004-0007387 (Pub. Jan. 15, 2004, "Smart-Ultrasonic/Sonic Driller/Corer), each of which is herein incorporated by reference in its entirety. That difference is the use of at least one additional mass to hammer the bit out of whatever material has been drilled.

It is contemplated that providing a drill or similar tool with the ability to hammer a bit out of, as well as into, a material has applicability for other types of drills than USDAs as well. However, U/S drill applications benefit from the fact that drilling direction selection can easily be accomplished by simply pushing/pulling the drill in the direction that the bit is to be driven. As such, an embodiment of the present invention may be characterized as a drill that hammers a bit into a surface when the drill is pushed towards the surface, and that hammers a bit out of a surface when the drill is pulled away from the surface. Alternatively, it may be characterized as a drill that hammers a bit in a first direction when a body of the drill is moved in that direction and/or closer to a distal end of the bit and in a second direction when it is moved in the second direction and/or farther from a distal end of the bit. It is also contemplated that selection of drilling direction by pushing/pulling a bit relative to a surface may be a novel aspect of the present invention that is applicable to other drilling mechanisms, regardless of whether drilling is accomplished by hammering, rotation, or some other means.

Anchor

Figure 6:
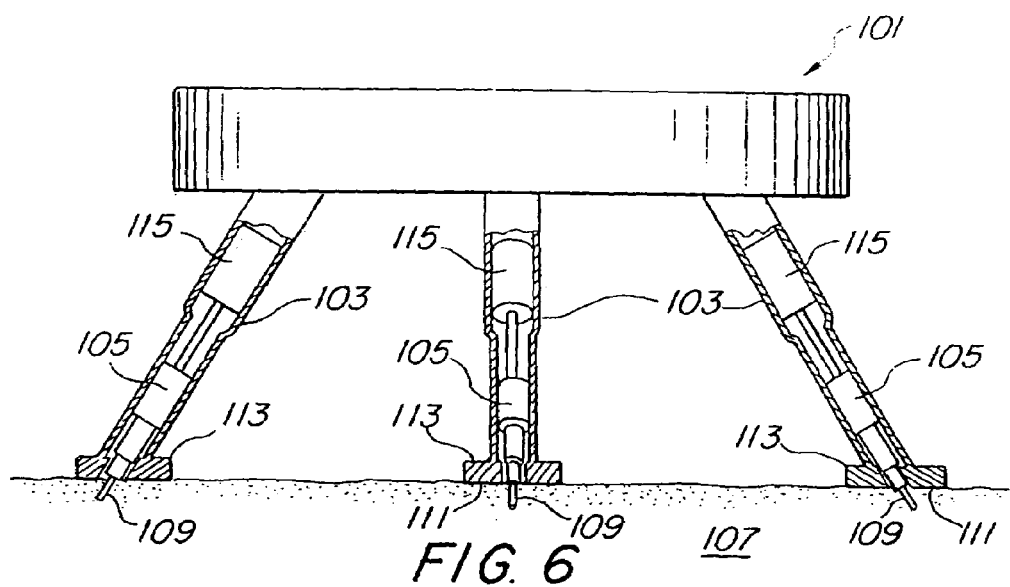
FIG. 6 is a cutaway side view of the platform of FIG. 5.

Referring to FIGS. 5 and 6, a platform 101 includes foot assemblies 103. The foot assemblies 103 include drill assemblies 105 which are used to anchor the apparatus to a surface 107. The drill assemblies 105 include drill bits 109 which can be moved between a retracted position, as shown in FIG. 5, wherein the drill bits 109 do not extend into the surface 107, and an extended position wherein the drill bits 109 do extend into the surface 107. As can be seen, when extended, the drill bits 109 extend through the bottom surfaces 111 of the feet 113 of the foot assemblies 103. To facilitate the extension and retraction of the drill bits 109, the platform 101 also comprises drill positioning assemblies 115.

The drill positioning assemblies 115 may comprise any mechanism that facilitates extension, and generally retraction, of the drill assemblies 105, or at least the drill bits 109. In some instances, the drill positioning assemblies 115 may function to extend the drill assemblies 105 a single time if the platform 101 is to be permanently anchored. In such an instance, the drill positioning assemblies 115 may comprise springs that are compressed while the drill bits 109 are retracted, and that can be released to push the drill assemblies 105 and to extend the drill bits 109. In such an instance, the drill assemblies 105 need not be able to extract themselves from the surface 107. In other instances the drill positioning assemblies 115 may function to both extend and extract the drill assemblies 105. In some such instances the positioning assemblies 115 may comprise hydraulic or screw mechanisms for moving the drill positioning assemblies 115. In some instances, the drill positioning mechanisms 105 may be replaced and/or supplemented by mechanism which move the drill bits 109 relative to the drill assemblies 105. Alternatively, the drill assemblies 105 and the drill bits 109 may function to extend and/or retract the drill bits 109 without the aid of any drill positioning assemblies.

In some instances, one of the foot assemblies 103 may be characterized as a foot assembly coupled to an apparatus and positioned to at least partially support the apparatus, the foot assembly comprising a drill bit wherein the drill bit can be extended such that it projects outward from the foot and retracted so that it does not project outward from the foot.

In alternative embodiments, the number of foot assemblies may vary. It is contemplated that in some instances every foot of a platform will include an anchoring drill assembly while in other instances less than all and possibly only one foot assembly may comprise an anchoring drill assembly. In some instances, a single foot assembly may comprise a plurality of anchoring drill assemblies.

The platform 101 may be self propelled or may be moved by some other apparatus. As an example, the platform 101 may be suspended from a balloon with the balloon used to move the apparatus from place to place. Once lowered into place by the balloon, the platform could anchor itself. At some later point when the platform was to be moved, the platform could retract its anchors to facilitate movement of the platform.

In some instances, the platform 101 may be characterized as embodying a method of anchoring an apparatus to a surface comprising: (a) providing the apparatus with at least one drill assembly comprising a drill bit; (b) using the drill bit to drill into the surface; (c) using the drill assembly as an anchor; (d) removing the drill bit from the surface; (e) moving the apparatus; (f) using the drill bit to drill into the surface; and (g) using the drill assembly as an anchor. With the embodiment shown in FIG. 5, anchoring the assembly at a particular location can be characterized as using at least two drill assemblies to insert at least two drill bits into the surface and to simultaneously use all of the at least two drill assemblies as anchors.

Climbing Tool

Figure 7:
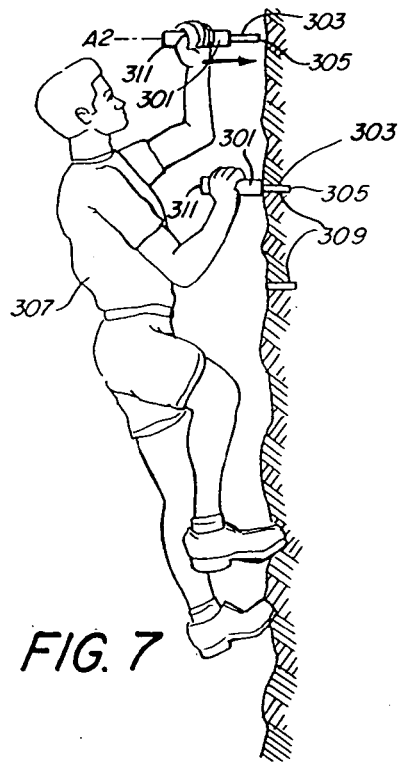
FIG. 7 is a side view of a climber using climbing tools in accordance with an embodiment of the invention.
Figure 8:
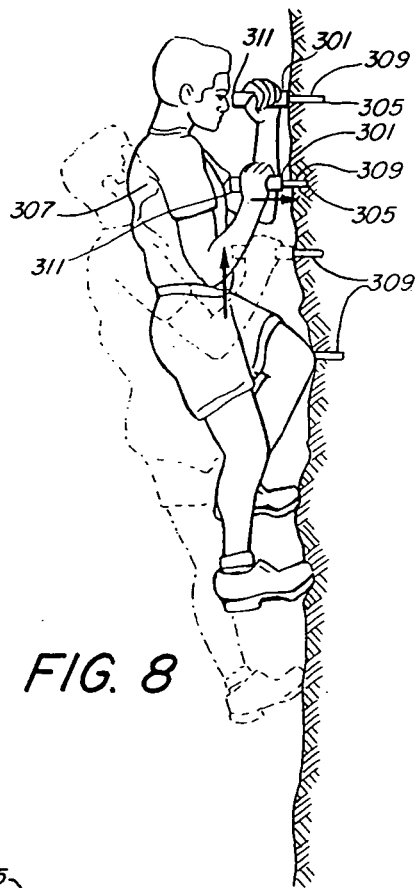
FIG. 8 is a side view of the climber of FIG. 7.

Another embodiment of the invention is a climbing tool that can be used by a climber. Referring to FIGS. 7–8, a climbing tool 301 includes a drill bit assembly 303 and a drill bit 305 and is adapted to support a climber 307 hanging from the tool 301 while the tool 301 remains in a hole 309 formed by the tool 301. As it is intended to be used to both drill the hole 309 and to support the climber 307, the drill bit assembly 303 and the drill bit 305 should be able to withstand the static and dynamic forces and/or moments they would subjected to when used in such a manner. Typically, larger and thicker bits and more powerful actuators will be needed as climber weight increases.

It is contemplated that in some instances an embodiment may advantageously use a bit 305 able to withstand a moment of 50 N·m, a tensile force of at least 400 N along the center axis A2, and/or a compressive force of at least 400 N along center axis A2, while in other instances 600 N, 800 N, 100 N or higher values may be more appropriate. In some instances, the tool 301 should also, while the drill bit is held stationary, be able to withstand an external force of 400 Newtons (approximately the force exerted by an 90 lb person hanging from the tool) applied to the end 311 of tool 301 opposite of the drill bit 305, and in a direction perpendicular to the drill bit 305, without any element of the tool 301 fracturing or plastically deforming.

As can be seen from the figure, the climbing tool 301 is a hand held device sized, dimensioned, and shaped for use by climber 307 while climbing surface 311. The climbing tool 301 may include the elements and function in the same manner as the drill of FIG. 1, or may comprise an alternative drilling mechanism. It is contemplated that with appropriate modifications, tool 301 can be coupled to multiple feet and/or hands of the climber. If provided with a tool for each hand and each foot, the climber would be able to "crawl" up a rock face or underneath an overhang.

Figure 9:
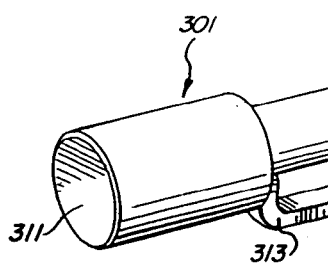
FIG. 9 is a perspective view of a climbing tool in accordance with an embodiment of the invention.
Figure 10:
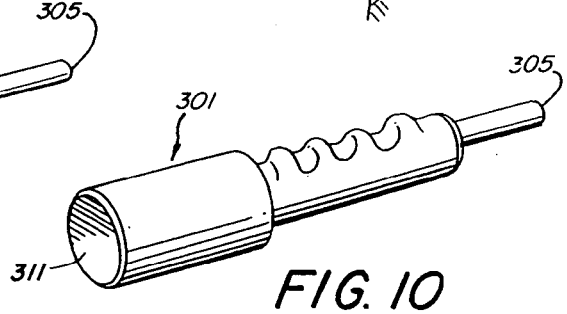
FIG. 10 is a perspective view of a climbing tool in accordance with an embodiment of the invention.
Figure 11:
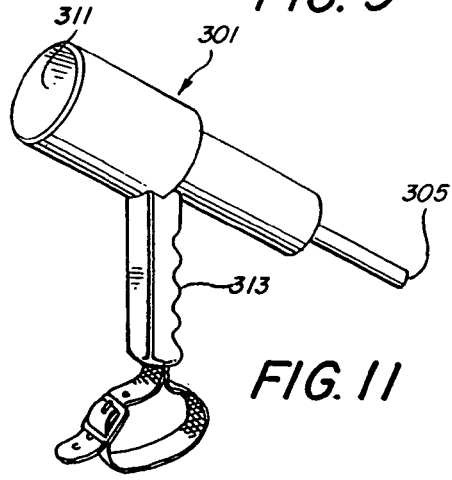
FIG. 11 is a perspective view of a climbing tool in accordance with an embodiment of the invention.
Figure 12:
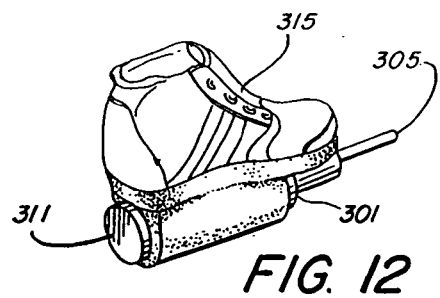
FIG. 12 is a perspective view of a climbing tool in accordance with an embodiment of the invention.

A few of many possible embodiments are illustrated in FIGS. 9–12. In FIG. 9, the tool 301 comprises a handle 313 which is grasped by a climber while using tool 301. In FIG. 10, a portion of the body of the tool 301 is sized and shaped to be gripped by a climber. In FIG. 11, the tool 301 comprises a handle 313 which extends from the body of tool 301 to facilitate angular placement of the tool 301 and possibly to extend the reach of a climber. Regardless of the particular configuration used, it is contemplated that various straps and other mechanisms will be included that help prevent the tool from being lost or getting in the way of the climber while climbing, and/or to help a climber obtain support from the tool while it is anchored. In FIG. 12, tool 301 is coupled to a boot 315 such that it can be worn by a climber and used as a foot anchor while climbing.

It is also contemplated that a USDA may be used in a more traditional manner as a rock drill for creating holes in which to insert separate anchors. Generally, mountain climbing involves drilling holes in cliffs and posting bolts to provide support attachment for a climber. The use of the U/S anchor can reduce the drill mass and increase the safety issues of this process of making holes and, in addition, it provides the ability to support the climbers by directly attaching themselves to the surface of the cliffs that are being climbed.

Removable Bit Anchor

During testing, a U/S drill was used with a bit having an external diameter of 5.7 mm and an inner diameter of 4.5 mm. This bit was used to drill a 2×2 ft block made of Santa Barbara Limestone and it was drilled at approximately 30 degrees with the normal to the surface allowing the bit to serve as a mounting anchor. An average power of 14 Watts was used to penetrate the block in 10 minutes to a depth of 28 mm. Then, the actuator and free mass were removed, and a 9 kg platform was mounted on and left suspended from the bit. The bit used was made of stock stainless steel with a yield strength of 200 MPA. Calculations show that a bit made of high yield alloy steels (Yield strength $>=1.7$ GPa) can be used to anchor 12 kg mass that is mounted at the end of a moment arm (i.e. bit length) that is 0.5 m long.

As this example illustrates, in some embodiments a drill may comprise a removable bit sized and dimensioned to function as an anchor after being used to drill a hole, and, while remaining in the hole, being removed from the drill. After removal of the drill, the bit is used as an anchor. As such, an embodiment of the invention may be characterized as an anchor placement tool that utilizes an anchor to be placed which is removeably coupled to the tool as a drill bit for forming a hole to receive anchor.

NASA Applications

Increasingly, missions of the United States National Aeronautics and Space Administration (NASA) are involved with in-situ exploration tasks where anchoring is becoming a critical aspect of the mission. The use of an anchor that can be easily mounted and extracted while requiring very low axial force is critical for missions to planets with a very low gravity. Such a capability to anchor via low axial load using low mass device and relatively low power is needed to support such NASA platforms as legged and wheeled rovers as well as inflatable structures and landers that would operate in low g environments and explore possible water rich environments including canyon walls. Also, it can be used to support astronauts who may need to climb steep mountains as pat of future exploration by humans in rugged extraterrestrial terrain.

Generally, winds exist on various planets that NASA is seeking to explore. The collection of specific samples from aerial vehicles requires that the vehicle be anchored to a fixed location on the surface of a planet or other body being explored. Such wind can be as strong as 1 m/s as on Venus, and therefore the vehicle is expected to move before a sample can be collected necessitating a fast and reliable anchoring mechanism. The number of anchors that may be needed would depend on the wind conditions, where a steady wind permits the use of one anchor. A fully reliable and repeatable positioning is expected to require three anchors. On the other hand, two anchors can be a compromise between vehicle stability and ease of implementation. Anchoring can be accomplished using U/S anchors allowing its application onto very hard and smooth surfaces.

What is claimed is:

1. An apparatus comprising a drill bit, a hammer mechanism for hammering the drill bit in a first axial direction and in a second axial direction, opposite to the first axial direction, the hammer mechanism comprising at least a first mass and first impact surface to hammer the drill bit in the first axial direction and at least a second mass and second impact surface to hammer the drill bit in the second axial direction and a selection mechanism for controlling whether, at a given point in time, the drill bit is hammered in the first or second axial direction;

wherein the drill bit is elongated and the first and second axial directions are opposite each other along the length of the drill bit; and the hammer mechanism comprises the first mass and the first impact surface and the second mass and the second impact surface with the first and second masses moveable relative to and along a center line of the drill bit and wherein impact of the first mass on the first impact surface results in a force exerted on the drill bit in the first direction and impact of the second mass on the second impact surface results in a force exerted on the drill bit in the second direction; and wherein the first and second masses are positioned on opposite sides of a vibrating element, which, when vibrating, causes the first mass to oscillate between the vibrating element and the first impact surface or causes the second mass to oscillate between the vibrating element and the second impact surface.

2. The apparatus of claim 1 wherein the selection mechanism comprises the vibrating element;

the vibrating element is positioned between and moveable relative to the first and second impact surfaces such that movement of the vibrating element relative to the first and second impact surfaces simultaneously moves it closer to one and further from the other of the first and second impact surfaces; and if the vibrating element is closer to the first impact surface than to the second impact surface the drill bit is hammered in the first axial direction and if the vibrating element is closer to the second impact surface than to the first impact surface the drill bit is hammered in the second axial direction.

3. The apparatus of claim 2 wherein the vibrating element and the first and second masses are positioned within a cavity at least partially defined by the first and second surfaces wherein the cavity is part of a drill bit assembly comprising the drill bit such that movement of the cavity and the first and second surfaces coincides with movement of the drill bit.

4. The apparatus of claim 3 wherein the apparatus further comprises an actuator for generating vibrations and a horn for amplifying the generated vibrations, and the vibrating element is at least part of the horn and the horn extends from the actuator into the cavity of the drill bit assembly.

5. The apparatus of claim 4 wherein the drill bit assembly comprises a central bore extending along its length and separated from the drill bit cavity.

6. The apparatus of claim 3 wherein the vibrating element vibrates at a frequency of at least 5 kHz.

7. The apparatus of claim 1 wherein the apparatus is a hand held device sized, dimensioned, and shaped for use by a climber while climbing.

8. The apparatus of claim 7 wherein, while the drill bit is held stationary, the apparatus can withstand an external force of X Newtons applied to an end of the apparatus opposite of the drill bit, and in a direction perpendicular to the drill bit, without any element of the apparatus fracturing or plastically deforming, and X is at least 400.

9. The apparatus of claim 7 wherein the apparatus can withstand a moment of at least 50 N m.

10. The apparatus of claim 1 wherein the drill bit, hammer mechanism, and selection mechanism are part of a drill assembly used to anchor the apparatus to a surface.

11. The apparatus of claim 10 wherein the drill assembly is one of a plurality of assemblies adapted to anchor the apparatus to a surface.

12. The apparatus of claim 10 wherein the drill bit can be moved between a retracted position wherein the drill bit does not extend into the surface and an extended position wherein the drill bit does extend into the surface.

13. The apparatus of claim 12 wherein the apparatus comprises at least one foot and the drill bit or a drill bit assembly comprising the drill bit extends through a bottom surface of the at least one foot when in the extended position.

14. The apparatus of claim 13 wherein the apparatus comprises at least three feet and at least one drill assembly for each foot.

* * * * *